United States Patent
Robins et al.

(10) Patent No.: US 9,321,358 B2
(45) Date of Patent: Apr. 26, 2016

(54) LIGHT VEHICLES WITH ON-BOARD RAPID CHARGING SYSTEMS AND ASSOCIATED METHODS

(71) Applicant: Xtreme Products, Inc., North Las Vegas, NV (US)

(72) Inventors: Arthur Robins, Pensacola, FL (US); Sanford Leavitt, Las Vegas, NV (US); Neil Roth, Las Vegas, NV (US)

(*) Notice: Subject to any disclaimer, the term of this patent is extended or adjusted under 35 U.S.C. 154(b) by 262 days.

(21) Appl. No.: 13/936,988

(22) Filed: Jul. 8, 2013

(65) Prior Publication Data

US 2014/0009113 A1    Jan. 9, 2014

Related U.S. Application Data

(60) Provisional application No. 61/668,458, filed on Jul. 6, 2012.

(51) Int. Cl.
| | |
|---|---|
| *H02J 7/00* | (2006.01) |
| *B60L 11/18* | (2006.01) |
| *B60L 11/12* | (2006.01) |
| *B60K 6/46* | (2007.10) |

(52) U.S. Cl.
CPC ............ *B60L 11/1809* (2013.01); *B60K 6/46* (2013.01); *B60L 11/123* (2013.01); *B60L 11/1862* (2013.01); *Y02T 10/6217* (2013.01); *Y02T 10/7005* (2013.01); *Y02T 10/705* (2013.01); *Y02T 10/7044* (2013.01); *Y02T 10/7072* (2013.01)

(58) Field of Classification Search
CPC ............ Y02T 10/705; Y02T 10/7072; Y02T 10/7008
USPC ........................................................ 320/104
See application file for complete search history.

(56) References Cited

U.S. PATENT DOCUMENTS

| | | |
|---|---|---|
| 6,326,765 B1 | 12/2001 | Hughes et al. |
| 2007/0184339 A1 | 8/2007 | Scheucher |
| 2007/0235235 A1 | 10/2007 | Fukami et al. |
| 2007/0278990 A1* | 12/2007 | Raichle et al. ............... 320/104 |
| 2009/0250276 A1 | 10/2009 | Goodwin et al. |
| 2010/0019700 A1 | 1/2010 | Mattson |
| 2010/0089682 A1 | 4/2010 | Martini et al. |
| 2010/0194355 A1 | 8/2010 | Wada et al. |
| 2011/0046831 A1 | 2/2011 | Ananthakrishna |

(Continued)

OTHER PUBLICATIONS

United States Patent and Trademark Office, Acting as the International Searching Authority, "International Search Report and Written Opinion," mailed Mar. 10, 2015 in international patent application No. PCT/2014/045672.

*Primary Examiner* — Stacy Whitmore
(74) *Attorney, Agent, or Firm* — Durham Jones & Pinegar, P.C. Intellectual Property Law Group

(57) ABSTRACT

A light vehicle is provided with a drive train that is powered by an electric motor. The electric motor receives power from a battery and may also receive power from an onboard generator. The onboard generator is a rapid charge generator that provides a direct current (DC) signal to provide a rapid charge to the battery while the light vehicle is either stationary or moving. The light vehicle may also be equipped with a vehicle management system that controls the charge and discharge of the battery. The vehicle management system may also monitor and control the operation of the on-board rapid charge generator and the electric motor.

17 Claims, 6 Drawing Sheets

(56) References Cited

U.S. PATENT DOCUMENTS

| | | |
|---|---|---|
| 2012/0080249 A1 | 4/2012 | Yates, III et al. |
| 2012/0253576 A1 | 10/2012 | Tamagawa |
| 2013/0026998 A1 | 1/2013 | Dyer et al. |
| 2013/0069426 A1 | 3/2013 | Nien et al. |
| 2013/0131904 A1 | 5/2013 | Park et al. |
| 2014/0292260 A1* | 10/2014 | Dyer et al. .................... 320/107 |
| 2015/0021995 A1* | 1/2015 | Chang et al. .................... 307/31 |

* cited by examiner

LIGHT VEHICLES WITH ON-BOARD RAPID CHARGING SYSTEMS AND ASSOCIATED METHODS

This application claims priority under 35 U.S.C. §119(e) to U.S. Provisional Patent Application No. 61/668,458 by Arthur Robins et al. and titled "LIGHT VEHICLES WITH ON-BOARD RAPID CHARGING SYSTEMS AND ASSOCIATED METHODS" filed Jul. 6, 2013, which is incorporated herein by this reference in its entirety.

TECHNICAL FIELD

This disclosure relates generally to hybrid vehicles, vehicle management systems, and, more specifically, to light vehicles that are configured to run on electricity and that include an on-board charging system.

RELATED ART

With the increasing costs of gasoline, more and more individuals and companies are looking for opportunities to save money on transportation. In addition, consumers, businesses, and governments are becoming increasingly aware of the environmental costs of motor vehicles. As a result, increasing focus is being placed on electric vehicles.

One common concern with electric vehicles relates to "range anxiety," which references the limited range available to electric vehicles. Range anxiety can prevent consumers from purchasing all-electric vehicles.

For plug-in electric vehicles, four main charging systems are available: (1) mode 1 is slow charging from a regular electrical socket (1 phase- or 3 phase); (2) mode 2 is slow charging from a regular socket equipped with some electric vehicle-specific protection arrangements such as Park and Charge or PARVE systems; (3) mode 3 is slow or fast charging using a specific electric vehicle multi-pin socket with control and protection functions such as the SAE J1772 and IEC 62196; and (4) mode 4 is fast charging using special charging technology such as CHAdeMO.

Generally, these can be grouped into three levels of charging: (1) alternating current (AC) energy from common grounded household receptacles such as those used by individuals and small businesses which connect to the electric vehicle using a charger on board the vehicle; (2) AC energy from a 208 volt (V) to 240 V single phase source with a maximum current is typically specified as 32 amperes (A) (continuous) and a branch circuit breaker rated at 40 A, as may be found in some homes and businesses and as part of the dial in newer charger stations, to a charger on board the vehicle; and (3) DC energy from an off-board charger. These chargers tend to provide large amounts of DC power and require specialized connectors and safety protocols.

The following table identifies several conventional scenarios for charging electric vehicles:

| Charging time | Power supply | Voltage | Max current |
| --- | --- | --- | --- |
| 6-8 hours | Single phase - 3.3 kW | 230 VAC | 16 A |
| 2-3 hours | Three phase - 10 kW | 400 VAC | 16 A |
| 3-4 hours | Single phase - 7 kW | 230 VAC | 32 A |
| 1-2 hours | Three phase - 24 kW | 400 VAC | 32 A |
| 20-30 minutes | Three phase - 43 kW | 400 VAC | 63 A |
| 20-30 minutes | Direct current - 50 kW | 400-500 VDC | 100-125 A |

The long periods of time required to charge an electric vehicle can dissuade consumers from purchasing such vehicles. While some electric vehicles use an onboard internal combustion engine (ICE) to help power the drive train and/or to provide power for the battery and/or the electric motor, these onboard systems do not provide rapid DC charging.

SUMMARY

A light vehicle (such as an all-terrain vehicle (ATV), utility task vehicle (UTV), a scooter, a motorcycle, or the like) includes an on-board rapid charge generator. The on-board rapid charge generator may be configured to charge one or more batteries (and/or one or more battery systems(s)) of the light vehicle, to deliver power to one or more electric motors of the light vehicle, or both. The on-board rapid charge generator may operate at a relatively low voltage; for example, the onboard rapid charge generator may operate at 120 V, at a voltage from about 44 V to about 144 V, or other lower voltage.

In some embodiments, the light vehicle may also include a vehicle management system. The vehicle management system operates as a central processing center, ensuring the health and wellbeing of the electric and electronic component systems. The vehicle management system may record data as a diagnostic tool, prevent overheating of the batteries, the controllers, and the motor. The vehicle management system may be configured to monitor the amount of charge stored by each cell of each battery, the rate at which each cell discharges, the rate at which each cell charges, the amount of power drawn by each electric motor, operation of the on-board rapid charge generator (e.g., the amount of power generated by the on-board rapid charge generator, etc.) and any other suitable parameter(s). The vehicle management system may also be configured to control the amount(s) of power delivered to each battery and/or each electric motor of the light vehicle. Such power delivery may be responsive to the state of the light vehicle; for example, the amount of power drawn by each electric motor of the light vehicle as the on-board rapid charge generator operates.

Operation of the on-board rapid charge generator may be automated. For example, the vehicle management system may initiate operation of the on-board rapid charge generator when the charge stored by a predetermined number (e.g., four, etc.) of cells of a battery of the light vehicle dip below a predetermined threshold. Charging of the battery or batteries may continue until a predetermined number of cells (e.g., all of them, all but one, etc.) store a full charge. Once the batteries have been charged, the vehicle management system may cause the on-board rapid charge generator to supply power to one or more electric motors of the light vehicle (and may tailor the amount of power supplied to each electric motor) or it may shut down the on-board rapid charge generator. During the rapid charging process, the vehicle may continue to operate (i.e., be mobile) or stationary.

A rapid charge generator may be configured to selectively deliver direct current (e.g., to a battery, to an electric motor, etc.) or alternating current (e.g., to an external electric component, etc.).

Various embodiments of methods for charging batteries of light electric vehicles and operating light electric vehicles are also disclosed.

Other aspects, as well as features and advantages of the disclosed subject matter, will become apparent to those of ordinary skill in the art through consideration of the ensuing description, the accompanying drawings and the appended claims.

DETAILED DESCRIPTION

Referring in general to the accompanying drawings, various embodiments of the present invention are illustrated to show the structure and methods for a light vehicle with onboard rapid charging capabilities. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosed subject matter.

The following provides a more detailed description of ways to implement the disclosed subject matter and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present invention may be practiced by numerous other solutions. For the most part, details concerning timing considerations and the like have been omitted where such details are not necessary to obtain a complete understanding of the disclosed subject matter and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
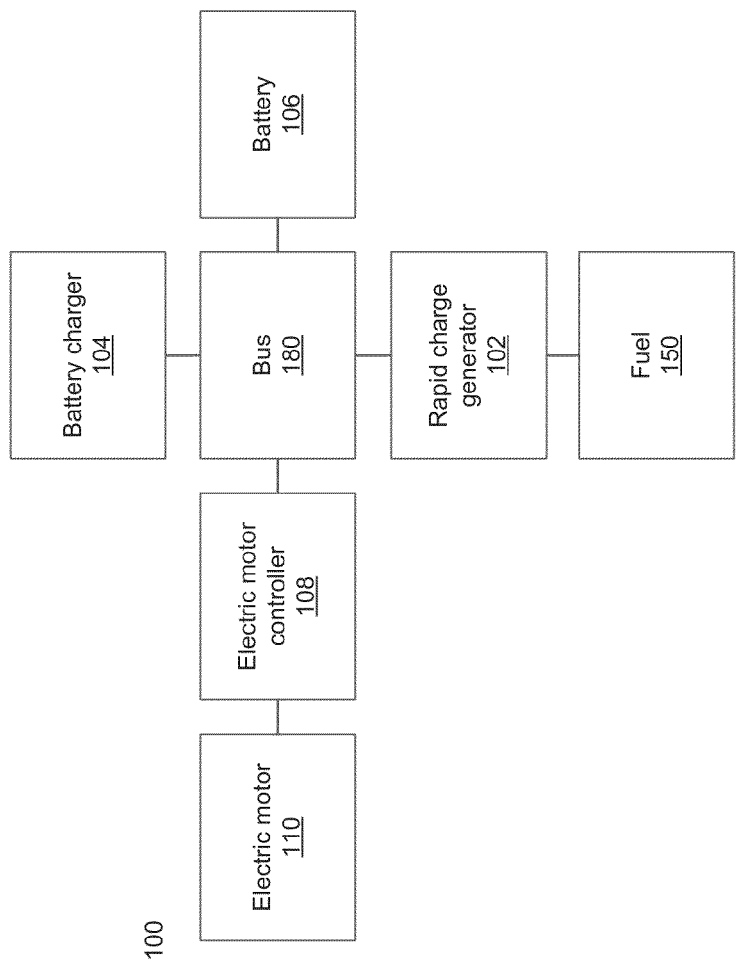
FIG. 1 is a schematic block diagram illustrating an embodiment of a system for powering an electric motor of a light vehicle.
Figure 6:
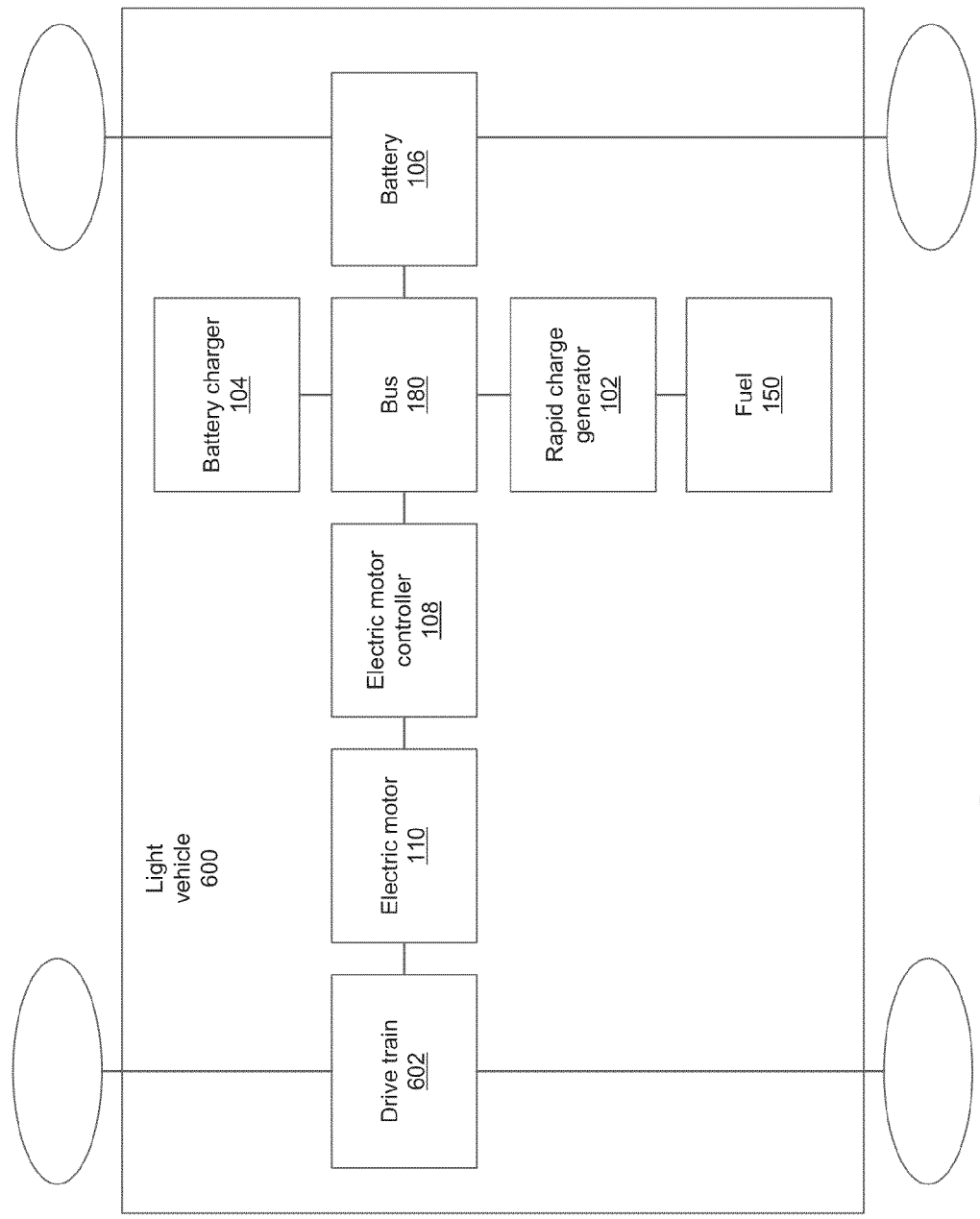
FIG. 6 is a schematic block diagram illustrating an embodiment of a light vehicle including a system for powering an electric motor.

FIG. 1 illustrates one embodiment of a system 100 for powering an electric vehicle. In one embodiment, the electric vehicle is a light vehicle 600 as shown in FIG. 6. As used herein, the term "light vehicle" refers to a vehicle having a weight of less than 5,500 pounds. In one embodiment, the light vehicle has a weight of less than 2,000 pounds. The light vehicle may be an all-terrain vehicle (ATV), a utility task vehicle (UTV), a scooter, a motorcycle, or other wheeled or track vehicle. While FIG. 6 illustrates a light vehicle 600 with four wheels, the illustration is by way of example and not limitation. The light vehicle 600 may have any number of wheels or, in certain embodiments, a track.

The light vehicle 600 may be an electric vehicle that is propelled by a drive train 602 powered by the electric motor 110. The light vehicle 600 may be a rear-wheel drive, front-wheel drive, or have another suitable configuration for a drive train 602. The light vehicle 600 may include an electric motor 110 for providing the necessary propulsion to move the light vehicle 600 and an electric motor controller 108 for controlling the electric motor 110. The light vehicle 600 may also include a battery 106 for providing electrical power to the electric motor 110 and a battery charger 104 for charging the battery from a suitable source such as an electrical outlet. A rapid charge generator 102 may provide electrical power to the electric motor 110 using fuel 150 such as gasoline, propane, or other.

In the embodiment shown, the light vehicle 600 allows a user to travel using electricity from the battery 106 and also benefits from the range extension provided by the rapid charge generator 102. The rapid charge generator 102 also charges the battery 106 more rapidly than in conventional systems as described below and may also provide electrical power directly to the electric motor 110 to supplement the electrical power provided by the battery 106 or, in certain embodiments, to provide all electrical power used by the electric motor 110.

Referring to FIG. 1, the system 100 includes a rapid charge generator 102. The rapid charge generator 102 uses fuel 150 to generate electrical energy for the system 100. The rapid charge generator 102 may include an internal combustion engine (ICE). The fuel 150 may be gasoline, natural gas, propane, diesel, or other. In certain embodiments, the rapid charge generator 102 may operate using one or more types of fuel. For example, the rapid charge generator 102 may be a multi-fuel generator that is capable of using one or more of a variety of fuel sources. The rapid charge generator 102 may, for example, run on both gas and propane. In certain embodiments, the rapid charge generator 102 may include a reservoir for storing the fuel 150. The system 100 may also include a securing element for securing an external reservoir of fuel 150 connected to the rapid charge generator 102; for example, the system 100 may include a securing element that secures a propane tank to the light vehicle during operation.

The rapid charge generator 102 may provide a DC output for the battery charger 104 to use in charging the battery 106. The rapid charge generator 102 may include an AC generator with an AC to DC converter that transforms the AC electrical signal into a regulated DC electrical signal. In other embodiments, the rapid charge generator 102 may included a DC to AC converter that transforms the DC electrical signal into a regulated AC electrical signal. One or more components of the system may convert the DC electrical output of the rapid charge generator 102 to other output forms suitable for use; for example, the electric motor controller 108 may convert the DC output to a three phase AC signal. In one embodiment, the rapid charge generator 102 provides a maximum of 100 Amperes of current. The rapid charge generator 102 may be configured to provide power to charge the battery 106 at up to five times the C-rate of the battery 106. The rapid charge generator 102 may have the ability to provide voltage and current that is predicated on the size of an internal combustion engine (ICE) of the rapid charge generator 102, the fuel 150, the operating environment, and the requirements for a given situation.

In one embodiment, the rapid charge generator 102 is a 6,000 Watt generator. The rapid charge generator 102 may charge the battery 106 by providing 35 A when the light vehicle is stationary. When the light vehicle is running and mobile, the rapid charge generator 102 may make between 70 and 85 A of current available to the electric motor 110 and the battery 106.

In certain embodiments, the rapid charge generator 102 may also include an AC regulating circuit that provides a regulated AC voltage that is equivalent to mains electricity for the territory for which the light vehicle is designed. For example, in the United States, the AC regulating circuit may provide nominal voltage of 120 V at 60 Hz. The regulated AC voltage may be provided in addition to the DC voltage used to provide electrical energy to the battery 106. As a result, the light vehicle may also be capable of providing a built-in AC power source without the need for additional electronics.

In one embodiment, the AC regulating circuit is configured to draw power from either the rapid charge generator 102 or the battery 106. The AC regulating circuit may only be useable while the light vehicle is stationary. The user may have the ability to activate the AC regulating circuit through a physical switch, a button, an electronic input, or other suitable inputs.

In one embodiment, the rapid charge generator 102 may be a modified Genset welding generator with the ability to provide AC output power, voltage regulation, and over-charge protection for the battery 106. The rapid charge generator 102 is capable of providing a high output amperage to the system 100. In a particular embodiment, the rapid charge generator 102 is a 6,000 Watt system and the electric motor 110 is an 8 horsepower (hp) motor. In another embodiment, the rapid charge generator 102 is an 8,000 Watt system and the electric motor 110 is a 10 horsepower (hp) motor. Such an embodiment may be used for a UTV. For an ATV, a rapid charge generator 102 that is a 4,000 Watt system may be sufficient based on motor size and the desired performance characteristics. In various embodiments, the rapid charge generator 102 generates less than 30,000 watts.

The power generating capability of the rapid charge generator 102 may be selected based on the capacity of the battery 106. In one embodiment, the battery 106 is a 100 Ah battery. The rapid charge generator 102 may be selected such that is can provide up to 300 A into the system 100 for charging the battery 106 and/or powering the electric motor 110. In another embodiment, the rapid charge generator 102 may provide up to 500 A into the system 100. The rapid charge generator 102 may be selected to provide a full charge to the battery 106 within one hour. The rapid charge generator 102 may charge the battery 106 at a rate of about 1 C to about 5 C.

In one embodiment, the light vehicle is a series hybrid that is powered by the electric motor 110 and not by an engine associated with the rapid charge generator 102. In such an embodiment, the electric motor 110 propels the light vehicle using electrical energy it receives and is not directly assisted by an internal combustion engine. The electric motor 110 may receive the electrical energy from the battery 106, the rapid charge generator 102, or both. In a parallel hybrid, an electric motor is used to provide power to the drive train and an internal combustion engine is also used to provide power to the drive train. The internal combustion engine may also be used to generate electricity to charge the batteries.

The system 100 may also include an electric motor 110 for propelling the light vehicle. In certain embodiments, the electric motor 110 may operate using lower levels of electrical energy than those associated with full-sized vehicles. In one embodiment, the electric motor 110 operates with a voltage of 144 Volts. The electric motor 110 may operate with a normal range of operation of between 24 Volts and 144 Volts. In one embodiment, the electric motor 110 has a normal range of operation between 72 V and 96 V.

The electric motor 110 may have an associated electric motor controller 108 that manages and controls operation of the electric motor 110. The electric motor controller 108 may receive information concerning the desired operation of the electric motor 110 and cause the electric motor 110 to respond. For example, the electric motor controller 108 may receive input from a user of the light vehicle concerning a desired speed. The electric motor controller 108 may compare that information with a current speed for the light vehicle and cause the electric motor 110 to increase or decrease the speed accordingly. Other functions of the electric motor controller 108 are discussed below.

The electric motor controller 108 may also control the amount of voltage and/or current supplied to the electric motor 110. The electric motor controller 108 may be connected to the battery 106 and the rapid charge generator 102 such that the electric motor controller 108 can provide electrical energy to the electric motor 110 from one or both of the battery 106 and the rapid charge generator 102. In certain embodiments, the electric motor controller 108 may be connected to only the battery 106 with the rapid charge generator 102 isolated from the electric motor controller 108 such that the rapid charge generator 102 only provides power to the battery 106 through the battery charger 104.

If the system 100 includes a battery 106, the battery 106 may provide electrical energy for operating the electric motor 110. In one embodiment, the battery 106 is a lithium ion battery such as a lithium iron phosphate battery. However, batteries other than lithium ion batteries may also be used. The battery 106 may include multiple cells. In one embodiment, each cell has a minimum discharge voltage of about 2.8 V, a working voltage of between 3 V and 3.3 V, and a maximum charge voltage of 3.6 V. In one embodiment, the battery 106 includes 24 cells. The example values provided above may change depending on the battery chemistry, the requirements of the electric motor 110, the requirements of the system, and other factors.

The battery 106 may be a 40 Ampere-hour (Ah) battery or a 60 Ah battery. In certain embodiments, the battery 106 may be a 100 Ah, 130 Ah, 180 Ah, or 200 Ah battery. The battery 106 may vary in the amount of amperage from 10-10,000 Ah within any given cell.

The battery charger 104 manages the charging process for the battery 106. The battery charger 104 may receive electrical energy from the rapid charge generator 102. In certain embodiments, the battery charger 104 may also be configured to receive electrical energy from other sources. The battery charger 104 may include an electrical plug that can connect with a standard alternating current (AC) power source such as an AC outlet. The battery charger 104 may support multiple charging modes.

The battery charger 104 may support mode 1 charging where the battery charger 104 connects to a standard one or three phase utilizing standardized socket-outlets. The battery charger 104 may also support mode 2 charging (slow charging from a regular socket with electric vehicle specific protections), mode 3 charging (slow or fast charging using a specific electric vehicle multi-pin socket) such as SAE J1772 and IEC 62196, or mode 4 charging that provides fast DC charging. In each of these modes, the battery charger 104 may connect to an external source (as opposed to a source that is onboard the light vehicle) of electrical energy and use that electrical energy to charge the battery 106. In one embodiment, when the battery charger 104 is connected with a 220 V connection, the battery charger 104 makes 25 A available to charge the battery 106.

FIG. 1 also illustrates a bus 180. The bus 180 may be any suitable power and/or communications bus for sharing electrical power and/or information associated with the system 100.

Figure 2:
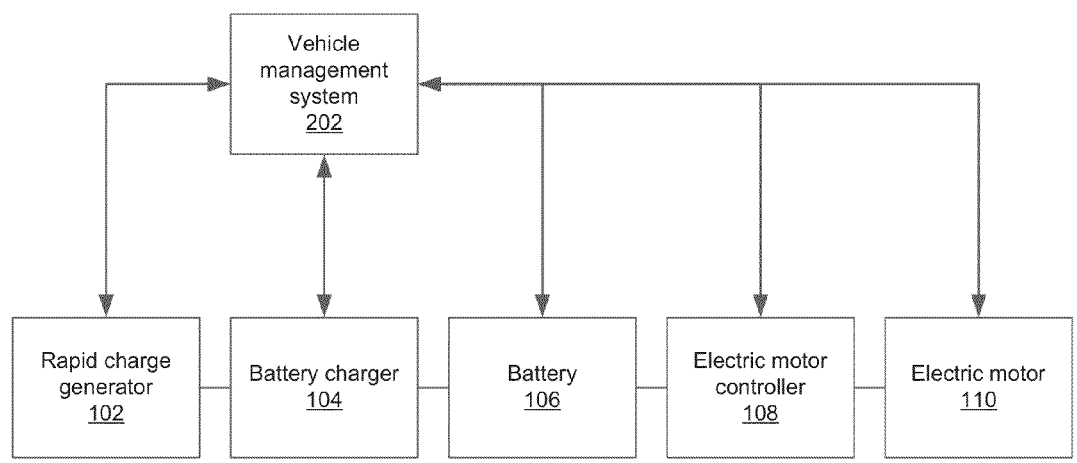
FIG. 2 is a schematic block diagram illustrating a vehicle management system in communication with components of a system for powering an electric motor of a light vehicle.

FIG. 2 illustrates a system 200 that is a subset of the system 100 with the addition of a vehicle management system 202. The vehicle management system 202 communicates with one or more additional electrical components of the light vehicle and coordinates actions between them to help with operation of the light vehicle. The vehicle management system 202 is a computing device such as a computer, a microcontroller, or other computing device capable of processing instructions. In the depicted embodiment, the vehicle management system 202 is in communication with the rapid charge generator 102, the battery charger 104, and the electric motor controller 108.

In one embodiment, the vehicle management system 202 provides dynamic adjustment of the voltage and current available to the system 200. For example, the vehicle management system 202 may allow for 84 V and 35 A when the light vehicle is at a standstill. The vehicle management system 202 may reduce the amount of current available as the voltage approaches its high limits. In one embodiment, at 85 V, current is limited to 4 A. At 86 V, current may be limited to 2 A. At 87 V, current is limited to amounts approaching 0 A.

In certain embodiments, the vehicle management system 202 may also provide dynamic adjustment of the voltage at which the electric motor 110 operates. For example, the electric motor 110 may be a 72 V system. The vehicle management system 202 may allow the system 200 to go to 84 V in total capacity and limit the ability of the rapid charge generator 102 to go above that limit. The vehicle management system 202 may also adjust and control the amount of current as discussed above. The vehicle management system 202 may allow the system 200 to run at 84 V as a constant while the rapid charge generator 102 is running, and reduce the voltage to 81-83 V when the rapid charge generator 102 is off.

Figure 3:
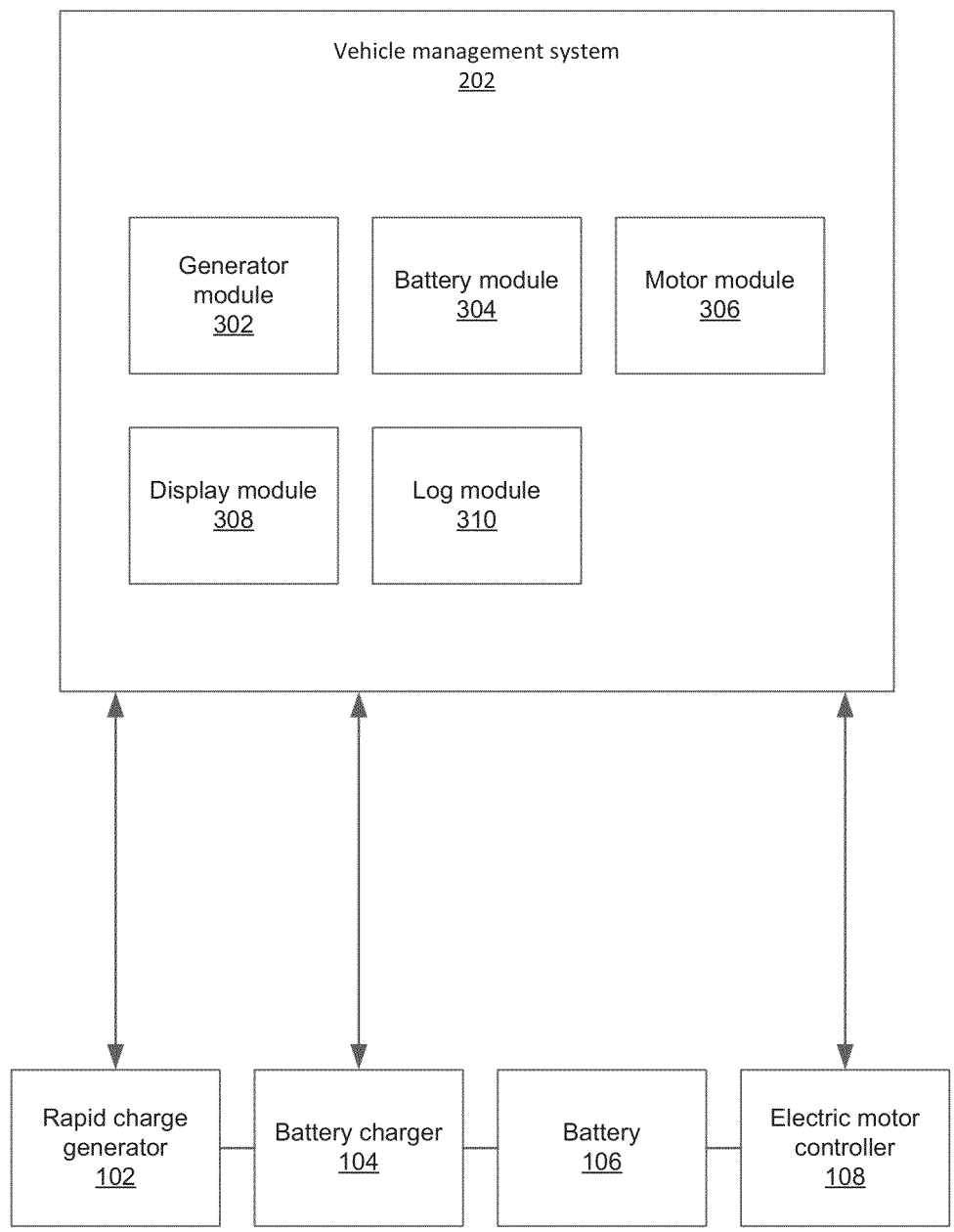
FIG. 3 is a schematic block diagram illustrating one embodiment of a vehicle management system.

FIG. 3 illustrates one embodiment of the vehicle management system 202 that includes a generator module 302, a battery module 304, and a motor module 306. While FIG. 3 illustrates the above-referenced modules as implemented in the vehicle management system 202, in other embodiments, the modules may be distributed in whole or in part across other components of the system; for example, the generator module 302 may be implemented in whole or in part in the rapid charge generator, the battery module may be implemented in whole or in part in the battery charger 104, and the motor module 306 may be implemented in whole or in part in the electric motor controller 108.

The generator module 302 may send commands to the rapid charge generator 102 and may also receive data from, and send data to, the rapid charge generator 102. In one embodiment, the generator module 302 commands the rapid charge generator 102 on and off. For example, the generator module 302 may command the rapid charge generator 102 on in response to the charge levels of the battery 106 depleting to a predetermined level. For example, the generator module 302 may command the rapid charge generator 102 on in response to the battery 106 depleting to approximately 40%. The generator module 302 may command the rapid charge generator 102 off in response to the charge levels of the battery 106 rising to a predetermined level. In one embodiment, the generator module 302 may command the rapid charge generator 102 off in response to the charge levels of the battery 106 rising to 99% while the light vehicle is stationary; the generator module 302 may command the rapid charge generator 102 off in response to the charge levels of the battery 106 rising to 90% while the light vehicle is moving. As a result, the rapid charge generator 102 may provide electrical energy to rapidly charge the battery 106 regardless of whether the light vehicle is moving or stationary.

In one embodiment, the generator module 302 may activate and deactivate an AC regulating circuit as described above. The generator module 302 may automatically deactivate the AC regulating circuit when the light vehicle is transitioned from an "off" state to an "on" state. The generator module 302 may activate the AC regulating circuit (or a DC regulating circuit) in response to a user input.

In certain embodiments, the generator module 302 may turn on the rapid charge generator 102 in response to the demands of the electric motor 110. If the electric motor 110 requires more electrical energy than the battery 106 can supply, the generator module 302 may activate the rapid charge generator 102 in order to provide additional power to the electric motor 110. The electric motor controller 108 may communicate to the motor module 306 of the vehicle management system 202 that the electric motor 110 requires more electrical energy, causing the generator module 302 to turn on and provide electrical power directly to the electric motor 110 through the electric motor controller 108 (i.e., the electrical energy does not need to go through the battery 106 to reach the electric motor controller 108, as described in connection with FIG. 1).

The vehicle management system 202 may also include a battery module 304. The battery module 304 may work with the battery charger 104 to control the charge and discharge cycles of the battery 106. As discussed above, the battery 106 may include multiple interconnected cells. The battery charger 104 may include electrical connections to each of the cells within the battery 106. The battery charger 104 may provide voltage and current to each of the cells of the battery 106 during the charging process. The battery charger 104 may also monitor the voltage and current flowing to each cell during the charging process. The battery charger 104 may also monitor the voltage and current at the input and output terminals for the battery 106 as a whole. In certain embodiments, the battery charger 104 also monitors the temperature of the battery 106. The battery charger 104 may also monitor the temperatures of one or more of the cells in the battery 106.

The battery module 304 may command the rapid charge generator 102 on and off based on data about the battery 106. For example, the battery module 304 may determine that the battery 106 is at 40% charge and cause the generator module 302 to power on and provide power to the battery 106 as discussed above.

The battery module 304 may also ensure that the voltages of the cells of the battery do not drop below a threshold amount. In certain battery types, if a cell is over discharged and falls below a set voltage, the cell's performance is damaged. In certain situations, the cell may be permanently damaged. The battery module 304 may continually monitor the voltage at each cell. In response to a cell approaching an over-discharge state, the battery module 304 may power on the rapid charge generator 102 and initiate charging of at least the cell that is approaching the over-discharge state.

The battery module 304 may further protect the battery 106 by limiting the power available to the electric motor 110. For example, if the battery module 304 determines that the electric motor 110 is pulling too much power from the battery 106, the battery module 304 may limit the power available to the electric motor 110 through the motor module 306. In one embodiment, if any cell hits a specified voltage level, the battery module 304 decreases the power to the electric motor 110 by half. In one embodiment, the specified voltage level is 15% above the over-discharge voltage. The battery module 304 may again half the power to the electric motor 110 in response to any cell reaching a second specified voltage level. In one embodiment, the second specified voltage level is 10% above the over-discharge voltage. The battery module 304 may prevent the electric motor 110 from drawing any power from the battery 106 in response to any cell reaching a third specified voltage level, such as a voltage within 5% of the over-discharge voltage. The battery module 304 may thus restrict the light vehicle to the electrical power provided by the rapid charge generator 102 in such a situation.

The battery module 304 may also protect against over charge of the cells of the battery 106. Charging a cell at a voltage beyond the upper cell voltage may damage the cell. Thus, the battery module 304 may control the voltage such that no cell is exposed to a voltage above the upper cell voltage. In addition, when the cells are fully charged, the battery module 304 may cause the generator module 302 to turn off the rapid charge generator 102.

The battery module 304 may further balance the charges of each cell in the battery 106. The battery 106 may perform better when each cell is at approximately the same voltage. However, not all cells necessarily discharge at the same rate or in the same way. The battery module 304 may continuously monitor the voltages at each of the cells in the battery 106 and dynamically adjust the amount of energy being added to each of the cells in order to balance the voltage levels in the battery 106. In one embodiment, the battery module 304 continuously monitors the voltages at each cell by checking the voltages at regular intervals.

In one embodiment, the battery module 304 balances the cells by reducing the amount of power available for charging as one or more cells approach their upper threshold voltage level. The power to charge the battery 106 may be applied to the battery 106 system as a whole, where the cells are in a series arrangement. The battery module 304 may reduce the amount of current provided to the battery 106. The reduction in current may allow the lower voltage cells to charge more quickly than the higher voltage cells, thus balancing the cells.

In one embodiment, the cells may be charged to within 5% of each other to achieve balance. For example, the battery module 304 may ensure that the cells are charged such that all cells are within 3.52±0.01.

The battery module 304 may cause the generator module 302 to activate the rapid charge generator 102 in response to one or more cells of the battery 106 measuring between 2.95 V and 3.0 V or below. The battery module 304 may cause the generator module 302 to turn off the rapid charge generator 102 in response to one or more cells of the battery 106 reaching 94% of the maximum voltage for the cell. In one embodiment, the battery module 304 causes the rapid charge generator 302 to turn off when one or more cells reach between 3.395 V and 4.0 V.

In one embodiment, the battery module 304 determines whether the battery 106 is being charged by an off-board electrical power supply such as an electrical outlet. The battery charger 104 may be configured to communicate to the battery module 304 when the battery charger 104 is physically connected to an off-board electrical power supply. The battery module 304 may place the motor module 306 in a stationary state. In the stationary state, the motor module 306 may prevent the electric motor controller 108 (and thus the electric motor 110) from operating. For example, the motor module 306 may prevent a user from engaging the electric motor 110 while the motor module 306 is in the stationary state.

The battery charger 104 may similarly send a message to the battery module 304 in response to the battery charger 104 being disconnected from the off-board electrical power supply. In response, the battery module 304 may place the motor module 306 in a mobile state, allowing the electric motor 110 to move the vehicle. As a result, the vehicle management system 202 may prevent the user from accidentally driving away while the light vehicle is connected to an external power supply, damaging the vehicle and/or the power supply.

The battery module 304 may further monitor for situations where the power to the light vehicle is left on even when not in use. The battery module 304 may determine whether or not the light vehicle is in an "on" state, or whether one or more components of the light vehicle are drawing electrical power from the system 100. The battery module 304 may monitor the battery charge of the battery 106 as described above. In response to the battery 106 reaching a predetermined threshold when the light vehicle is not moving, the battery module 304 may automatically shut down the electrical system for the light vehicle. In one embodiment, the battery module 304 shuts down the electrical system when the battery 106 reaches 40% of its capacity. The vehicle management system 202 may, after displaying appropriate warnings, allow the user to manually bypass the shutdown.

The battery module 304 may further be configured to determine whether the electric motor 110 is using too much power. If the electric motor 110 is using an unsustainable amount of power, the battery module 304 may cause the vehicle management system 202 to provide a warning to the user. The battery module 304 may also be configured to detect over current conditions in the electrical system and to shut down the system in response to detecting an over current condition.

The vehicle management system 202 may also include a motor module 306. The motor module 306 may be responsible for communicating with the electric motor controller 108. The motor module 306 may monitor the power draw of the electric motor 110. In one embodiment, the motor module 306 monitors one or both of the voltage and the current drawn by the electric motor 110.

As explained above, the motor module 306 may regulate or limit the power available to the electric motor 110. In one embodiment, the motor module 306 enforces variable limits on the power available to the electric motor 110 based on the status of the light vehicle. The motor module 306 may have a maximum power level which the electric motor 110 may not exceed. The motor module 306 may have a generator only power level. The motor module 306 may limit the electric motor 110 to the generator only power level in response to the battery 106 going offline due to insufficient charge or errors. The motor module 306 may have a battery only power level. The motor module 306 may limit the electric motor 110 to the battery only power level in response to the rapid charge generator 102 running out of fuel, experiencing errors, or other issues that may prevent the rapid charge generator 102 from functioning to provide electrical power to the electric motor 110, the battery 106, or both.

In one embodiment, the electric motor controller 108 is configured to check in with the vehicle management system 202 at regular intervals. The electric motor controller 108 may be configured to send or receive stay alive messages, acknowledgements, or other communications. The electric motor controller 108 may send or receive messages in order to verify that the electric motor controller 108 is in communication with the vehicle management system 202. The electric motor controller 108 may be further configured to enter a minimum power level state in response to losing communication with the vehicle management system 202. In one embodiment, the minimum power level state is associated with a power level sufficient to provide a maximum speed of four to five miles per hour on flat terrain for the electric vehicle.

The motor module 306 may be configured to generate a message for the user in response to the vehicle management system 202 losing communication with the electric motor controller 108. The message may inform the user that the light vehicle is in a low-power state, and that repairs are necessary.

The motor module 306 may also manage the distribution of power generated by the rapid charge generator 102 between the battery 106 and the electric motor 110. In certain embodiments, the system is wired such that the charging wires of the rapid charge generator 102 can provide power to both the battery 106 and the electric motor 110. The motor module 306 may dynamically balance the allocation of the power between the battery 106 and the electric motor 110.

For example, a vehicle in heavy traffic may only be traveling at 10 mph and drawing 20 A of current. The rapid charge generator 102 may be on and 40 A of current may be available to the system. The motor module 306 may allocate 20 A to the electric motor 110 (via the electric motor controller 108) and the other 20 A may be allocated to the battery 106 (via the battery charger 104). Further in the drive, the light vehicle may leave traffic and accelerate to 35 mph. The electric motor 110 may then be drawing 50 A of current. The rapid charge generator 102 may increase the power available such that the electric motor 110 can draw 50 A of current with only 5-10 A available to the battery 106.

The vehicle management system 220 may also include a display module 308. The display module 308 may include a display screen (such as a liquid crystal display or other), speakers, and other output devices for providing information to a user of the light vehicle. The display module 308 may provide information concerning the light vehicle such as speed, current charge level, whether the rapid charge generator 102 is running, and the level of the fuel 150 supplying the rapid charge generator 102. The display module 308 may also display information about the charge state of the battery 106 such as the state of charge, the battery cell voltage, and the amps charging and/or discharging from the battery 106.

The display module 308 may also be used to communicate error messages to the user. For example, if a fault is detected, the display module 308 may display information about the detected fault. The display module 308 may also display a state for the light vehicle, such as the reduced power states described above.

In certain embodiments, the display module 308 may also be configured to receive input from the user. The display module 308 may provide one or more input devices such as buttons, keys, a touch screen, or other suitable input device. The user may use the display module 308 to communicate information and instruction to the vehicle management system 202.

The vehicle management system 202 may also include a variety of sensors distributed throughout the system. The vehicle management system 202 may use the sensors to check the heat that is generated on various components such as the electric motor 110, the electric motor controller 108, the battery 106, and others. If one or more monitored components registers a heat above a predefined heat threshold, the vehicle management system 202 may automatically shut down the entire light vehicle.

The vehicle management system 202 may also include a log module 310. The log module 310 may log information concerning the operation of the system including, by way of example, temperature information, current draw, voltage levels, battery levels, rapid charge generator 102 power generation, and error conditions. The log module 310 may log the information into memory, which information can be downloaded and analyzed for performance and diagnosis purposes.

Figure 4:
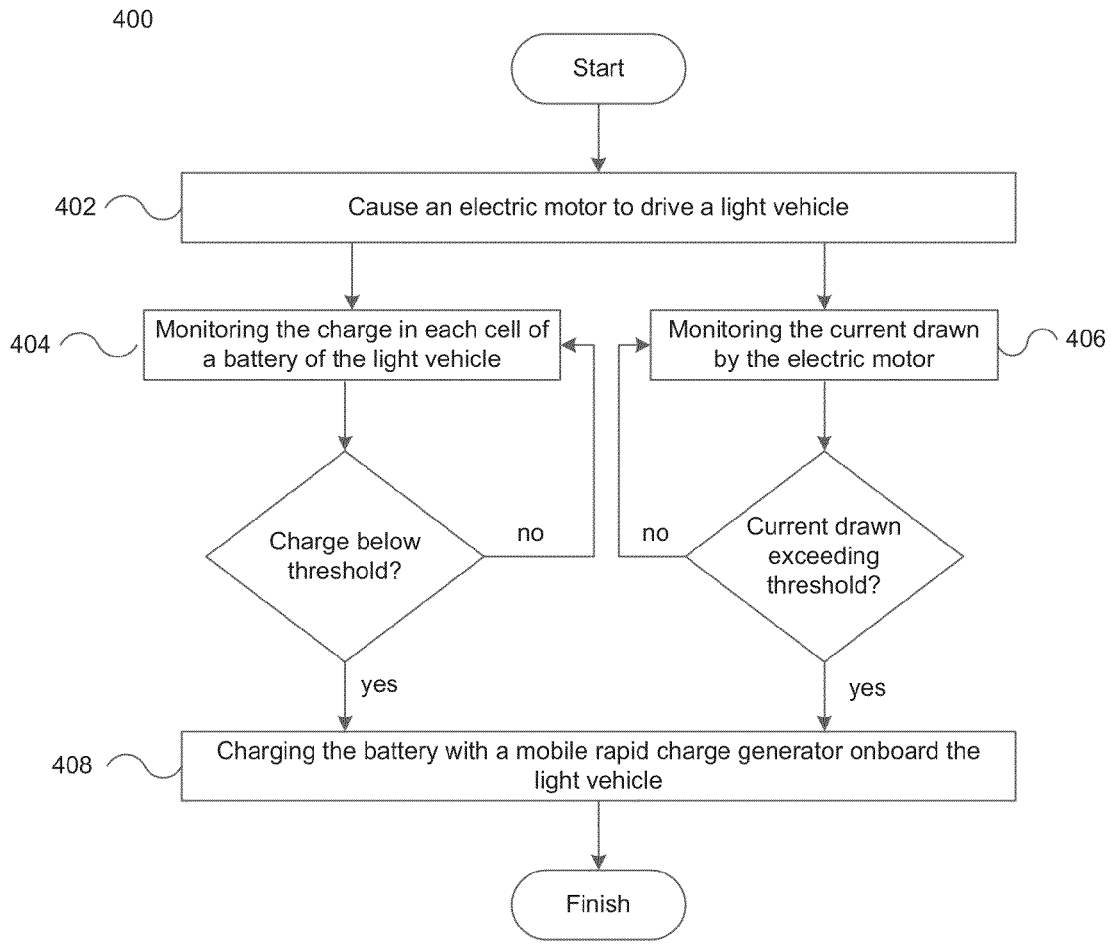
FIG. 4 is a flow chart diagram illustrating one embodiment of a method for providing electrical power to an electrical system of an electric light vehicle.

FIG. 4 illustrates one embodiment of a method 400 for managing an electrical system of a light vehicle that is a series hybrid. In one embodiment, the method 400 begins at reference numeral 402 with causing an electric motor 110 of the light vehicle to drive the light vehicle. The electric motor 100 may, for example, engage with the drive train to propel the light vehicle. The electric motor 110 draws current from at least one battery system 106 of the light vehicle.

The method 400 may also include monitoring, at reference numeral 404, a charge in each cell of the battery 106 of the light vehicle. In one embodiment, monitoring the charge is performed by monitoring the voltage level of the cells of the battery 106. If the charge is not below the threshold, the method 400 may continue with monitoring the charge in the cells of the battery at reference numeral 404.

If the charge in one or more cells falls below a predetermined low voltage threshold, the method 400 may involve, at reference numeral 408, charging the battery 106 with the mobile rapid charge generator 102 that is onboard the light vehicle. The energy provided to charge the battery 106 may be balanced such that the cells of the battery 106 are maintained at substantially the same voltage level. A vehicle management system 202 may automatically charge the battery 106 as specified in response to the charge falling below the predetermined threshold.

In one embodiment, the charging occurs while the light vehicle is not in operation. In other embodiments, the charging occurs while the light vehicle is operating.

The method 400 may also include, at reference numeral 406, monitoring the amount of current drawn by the electric motor 110. If the amount of current drawn by the electric motor 110 exceeds a predetermined operational current threshold, the method 400 may involve, at reference numeral 408, charging the battery 106. In certain embodiments, the method 400 may also include turning the rapid charge generator 102 on (such that it provides electrical energy) in response to the amount of current drawn exceeding the operational current threshold such that the rapid charge generator 102 provides additional current to the electric motor 110. In this manner, the rapid charge generator 102 may supply power to the electric motor 110 during operation of the electric motor 110.

In certain embodiments, charging the battery 106 involves applying the full power of the rapid charge generator 102 to the battery 106. The rapid charge generator 102 may charge the battery 106 in one hour or less.

Figure 5:
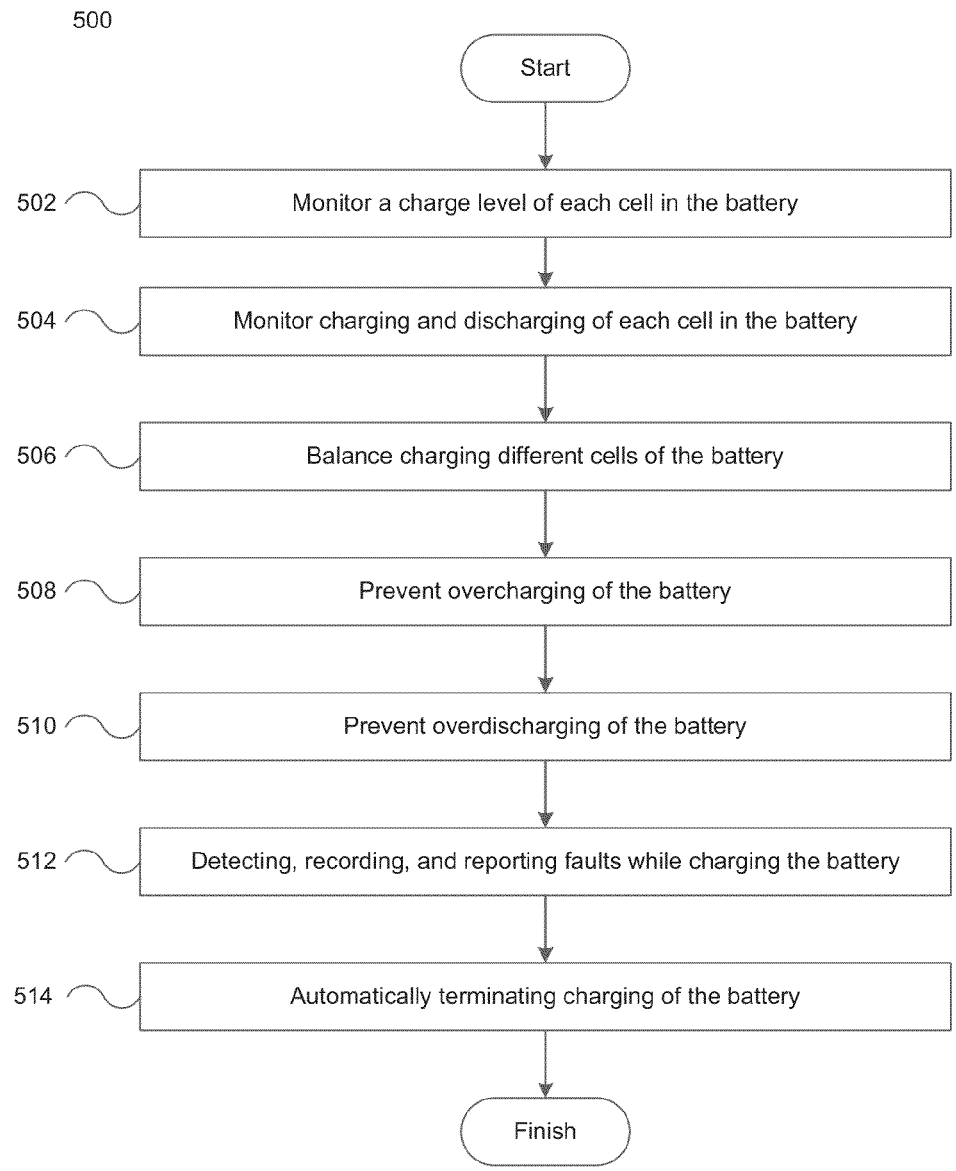
FIG. 5 is a flow chart diagram illustrating one embodiment of a method for charging the batteries of an electric light vehicle.

FIG. 5 illustrates one embodiment of a method 500 for battery management. The method 500 may involve, at reference numeral 502, monitoring a charge level of each cell in the battery 106. The method 500 may also involve, at reference numeral 504, monitoring the charging and discharging of each cell in the battery 106. The voltage level of each cell may be monitored, as well as the current, during charge and discharge. In certain embodiments, each cell of the battery 106 is individually monitored.

The method 500 may include, at reference numeral 506, balancing the charging of the different cells in the battery 106. In one embodiment, balancing the charge comprises dynamically adjusting the amount of power to each cell during charge such that the cells in the battery 106 have substantially equal voltage levels. Similarly, balancing the charge may comprise dynamically adjusting the amount of power drawn from each cell during discharge such that the cells in the battery 106 have substantially equal voltage levels.

The method 500 may also include, at reference numeral 508, preventing overcharging of the battery 106. As discussed above, the battery module 304 and the battery charger 104 may cooperate to stop the charging process when the voltage level of the battery 106 as a whole and/or when the voltage levels of the cells reach a predetermined voltage level. In one embodiment, the predetermined voltage level is set to 98% of the maximum voltage level, where the maximum voltage level is the voltage at which the cell is damaged.

The method 500 may further involve, at reference numeral 510, preventing over-discharge of the battery 106 and/or the individual cells of the battery 106. The method 500 may involve preventing over-discharge by charging the battery 106 using the rapid charge generator 102 before a low voltage threshold value is reached. The low voltage threshold value may be set to be above the minimum voltage level, where the minimum voltage level is the voltage at which the cell is damaged due to over discharge. The minimum voltage level, in one embodiment, may be within 0.5 V of the minimum voltage level. In certain embodiments, the method 500 may involve stopping discharge from the battery 106 in response to the battery 106 reaching a predetermined low voltage level. For example, where the minimum voltage level is 2 V, the method 500 may involve stopping discharge when the voltage is 2.3±0.1 V.

The method 500 may also involve, at reference numeral 512, detecting, recording, and reporting faults or abnormalities while charging or discharging the battery 106. The faults or abnormalities may be recorded in a memory device (such as flash memory) as part of a systems log. Faults or abnormalities may be reported through the log, through a display for the light vehicle, through audio output, or a combination thereof.

The method 500 may also involve, at reference numeral 514, automatically terminating charging of the battery 106. The charging may be automatically terminated in response to the battery 106 and/or the cells of the battery 106 reaching a predetermined threshold voltage. The charging may be automatically terminated in response to the light vehicle being turned off.

In other embodiments, the method 500 may also involve balancing the cells of the battery 106 upon initial configuration of the battery 106. A user may measure the resistances of each cell of the battery 106 and arrange the cells such that the resistance of each cell is within a 10% margin of resistance compared to the cells electrically in series with that cell. Matching the cells by resistance may help maintain a balanced battery 106. The user may also perform multiple charge and discharge cycles on the battery 106 before installation and monitor to ensure that the voltages across the cells are properly balanced.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A light vehicle comprising:
a drive train;
an electric motor for driving the drive train;
at least one battery for supplying power to the electric motor;
an on-board rapid charge generator for selectively supplying power to the at least one battery and the electric motor; and
a vehicle management system configured to:
communicate with the electric motor, the at least one battery and the on-board rapid charge generator;
control an amount of power generated by the on-board rapid charge generator based on a current drawn by another component;
cause the on-board rapid charge generator to generate a baseline current when no current is drawn by the electric motor or any external electric device; and
cause the on-board rapid charge generator to apply a full charge to the at least one battery in one hour or less.

2. The light vehicle of claim 1, wherein the vehicle management system monitors at least one of the electric motor and the at least one battery to determine a drive current to be delivered to the electric motor and a storage current to be delivered to the at least one battery.

3. The light vehicle of claim 2, wherein the vehicle management system is configured to increase the drive current and decrease the storage current as a current drawn by the electric motor increases.

4. The light vehicle of claim 1, wherein the vehicle management system is configured to:
monitor a voltage of each cell of the at least one battery; and
cause the on-board rapid charge generator to generate power if the voltage of at least a predetermined number of cells falls below a predetermined threshold.

5. The light vehicle of claim 1, wherein the vehicle management system causes the on-board rapid charge generator to generate a greater current when current is drawn by the electric motor or an external electric device.

6. The light vehicle of claim 1, wherein the another component comprises the electric motor of the light vehicle.

7. The light vehicle of claim 1, wherein the another component comprises an external electric device drawing power from the on-board rapid charge generator.

8. The light vehicle of claim 1, wherein the vehicle management system is configured to:
monitor a charge of each cell of the at least one battery;
monitor charging or discharging of each cell of the at least one battery;
automatically start the on-board rapid charge generator when at least one predetermined start-up condition exists;
balance charge across different cells of the at least one battery;
prevent overcharging of the at least one battery;
prevent overdischarging of the at least one battery;
detect, record, and report faults or abnormalities in the at least one battery or the on-board rapid charge generator; or
automatically shut down the on-board rapid charge generator when at least one predetermined shut-down condition exists.

9. The light vehicle of claim 1, wherein the on-board rapid charge generator is configured to generate voltage of about 44 V to about 144 V.

10. The light vehicle of claim 9, wherein the on-board rapid charge generator is configured to charge the at least on battery at a rate of about 1 C to about 5 C.

11. The light vehicle of claim 9, wherein the on-board rapid charge generator is configured to deliver an alternating current to at least one external electronic device.

12. A light vehicle comprising:
a drive train;
an electric motor for driving the drive train;
at least one battery for supplying power to the electric motor;
a on-board rapid charge generator for supplying power to the at least one battery during operation of the electric motor; and
a vehicle management system configured to:
communicate with the electric motor, the at least one battery and the on-board rapid charge generator;
control an amount of power generated by the on-board rapid charging generator based on a current drawn by another component;
cause the on-board rapid charge generator to generate a baseline current when no current is drawn by the electric motor or any external electric device; and
cause the on-board rapid charge generator to apply a full charge to the at least one battery in one hour or less.

13. The light vehicle of claim 12, wherein the on-board rapid charge generator is configured to supply power to the electric motor during operation of the electric motor.

14. The light vehicle of claim 12, further comprising:
a vehicle management system configured to:
calculate a storage current to be applied to the at least one battery;
calculate an operation current to be applied to the electric motor; and
selectively apply the storage current and the operation current.

15. A method for operating a light vehicle comprising:
causing an electric motor to drive the light vehicle, the electric motor drawing current from at least one battery of the light vehicle;
monitoring a charge in each cell of the at least one battery;
monitoring an amount of current drawn by the electric motor; and
with a vehicle management system, determining whether:
the charge in a predetermined number of cells of the at least one battery falls below a predetermined low voltage threshold; and/or
the current drawn by the electric motor exceeds a predetermined operational current threshold; and
if the charge in the predetermined number of cells of the at least one battery falls below the predetermined low voltage threshold or the current drawn by the electric motor exceeds the predetermined operational current threshold, and under control of the vehicle management system, charging the at least one batter with a rapid charge generator on board the light vehicle, the vehicle management system and the rapid charge generator being configured to generate a baseline current when no current is drawn by the electric motor or any external electric device and to fully charge the at least one battery within one hour.

16. The method of claim 15, wherein charging occurs while operating the light vehicle.

17. The method of claim 15, further comprising:
simultaneous with charging the at least one battery, directing an operation current to the electric motor.

* * * * *